(12) United States Patent
Tian et al.

(10) Patent No.: US 7,860,716 B2
(45) Date of Patent: Dec. 28, 2010

(54) SPEECH MODEL REFINEMENT WITH TRANSCRIPTION ERROR DETECTION

(75) Inventors: Ye Tian, Redmond, WA (US); Yifan Gong, Sammamish, WA (US); Frank K. Soong, Warren, NJ (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 11/789,132

(22) Filed: Apr. 24, 2007

(65) Prior Publication Data

US 2008/0270133 A1    Oct. 30, 2008

(51) Int. Cl.
*G10L 15/10* (2006.01)
(52) U.S. Cl. ...................................................... 704/251
(58) Field of Classification Search .................. 704/251
See application file for complete search history.

(56) References Cited

U.S. PATENT DOCUMENTS

| | | | |
|---|---|---|---|
| 6,122,613 A | 9/2000 | Baker | |
| 6,912,498 B2 | 6/2005 | Stevens et al. | |
| 7,003,463 B1* | 2/2006 | Maes et al. | 704/270.1 |
| 7,031,918 B2 | 4/2006 | Hwang | |
| 7,072,836 B2 | 7/2006 | Shao | |
| 7,165,031 B2 | 1/2007 | Rees | |
| 7,519,536 B2* | 4/2009 | Maes et al. | 704/270.1 |
| 2005/0033574 A1 | 2/2005 | Kim et al. | |
| 2005/0049868 A1 | 3/2005 | Busayapongchai | |
| 2006/0122834 A1* | 6/2006 | Bennett | 704/256 |

OTHER PUBLICATIONS

Evermann, et al., "Posterior Probability Decoding, Confidence Estimation and System Combination" http://www.itl.nist.gov/iaui/894.01/publications/tw00/pdf/cp230.pdf.
Riccardi, et al., "Active and Unsupervised Learning for Automatic Speech Recognition" http://citeseer.ist.psu.edu/cache/papers/cs/32892/http:zSzzSzwww.research.att.comzSz ~dturzSzpubszSzES-03-AL-UL.pdf/riccardi03active.pdf.
Soong, et al., "Generalized Word Posterior Probability (Gwpp) for Measuring Reliability of Recognized Words" http://www.geocities.com/wklo/doc/SoongSWIM2004.pdf.
Wessel, et al., "Confidence Measures for Large Vocabulary Continuous Speech D Recognition", Date: Mar. 2001, vol: 9, No. 3, http://www-i6.informatik.rwth-aachen.de/PostScript/InterneArbeiten/Wessel_ConfMeasForLVCSR_IEEESAP2001_March2001.pdf.

* cited by examiner

*Primary Examiner*—Susan McFadden (57) ABSTRACT

Reliable transcription error-checking algorithm that uses a word confidence score and a word duration probability to detect transcription errors for improved results through the automatic detection of transcription errors in a corpus. The transcription error-checking algorithm is combined model training so as to use a current model to detect transcription errors, remove utterances which contain incorrect transcription (or manually fix the found errors), and retrain the model. This process can be repeated for several iterations to obtain an improved speech recognition model. The speech model is employed to achieve speech-transcription alignment to obtain a word boundary. Speech recognizer is then utilized to generate a word-lattice. Using the word boundary and word lattice, error detection is computed using a word confidence score and a word duration probability.

20 Claims, 10 Drawing Sheets

FIG. 10 though for transcription processing. 20
Transcription errors of the training data will blur the phones
of acoustic models and thus degrade recognition perfor-
mance. As the accuracy of the models employed by a recog-
nition system improves, the impact due to transcription error
in training data will have a greater impact on overall operation
and output quality. Conventional approaches for resolving
transcription errors include manually perusing through the
whole transcription to correct the errors. However, this is very
expensive and time-consuming because the training data is
often very large. Error processing also includes randomly
sampling the data; however, this is not reliable.

SPEECH MODEL REFINEMENT WITH TRANSCRIPTION ERROR DETECTION

BACKGROUND

In speech recognition model training, typically, a set of speech data files and associated transcriptions are required. Transcription is what a user voices into the recognizer. Transcription error refers to a problem in transcribing acoustic events in the utterance. Transcription errors can be generally classified as deletion error, substitution error, and insertion error. Deletion error is un-transcribed speech or non-speech events in the recorded signal (e.g., coughs, background noise, etc.). Substitution error is mistranscription or misinterpretation of transcriptions (e.g., French <<e'>> transcribed as the phrase "accent aigu"). Insertion error includes transcription that describes more than what is recorded in the audio (e.g., wave file.

Conventionally, reliance is on the quality of the corpus that can be provided by the vendor for transcription processing. Transcription errors of the training data will blur the phones of acoustic models and thus degrade recognition performance. As the accuracy of the models employed by a recognition system improves, the impact due to transcription error in training data will have a greater impact on overall operation and output quality. Conventional approaches for resolving transcription errors include manually perusing through the whole transcription to correct the errors. However, this is very expensive and time-consuming because the training data is often very large. Error processing also includes randomly sampling the data; however, this is not reliable.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a reliable transcription error-checking algorithm that uses a word confidence score and a word duration probability to detect transcription errors in a corpus. This facilitates improved results through the automatic detection of transcription errors. The transcription error-checking algorithm is combined with model training so as to use a current model to detect transcription errors, remove utterances which contain incorrect transcription (or manually fix the transcription errors which are detected by the error-checking algorithm), and retrain the model. This process can be repeated for several iterations to obtain improved speech recognition model quality.

The speech recognizer and raw model are employed to achieve speech-transcription alignment to obtain a word boundary. Decoding is then utilized to generate a word lattice. Using the word boundary and word lattice, error detection is computed using a word confidence score and a word duration probability. Silence confidence scores can also be employed to detect deletion error.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Disclosed herein is a reliable transcription error-checking algorithm that uses a word confidence score and a word duration probability based on detected word boundaries to detect transcription errors. The transcription error-checking algorithm is combined with model training so as to use a current model to detect transcription errors, remove utterances which contain incorrect transcription, retrain the model and repeat as desired. Using the word boundary and a word lattice, error detection is computed using the word confidence score and the word duration probability.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
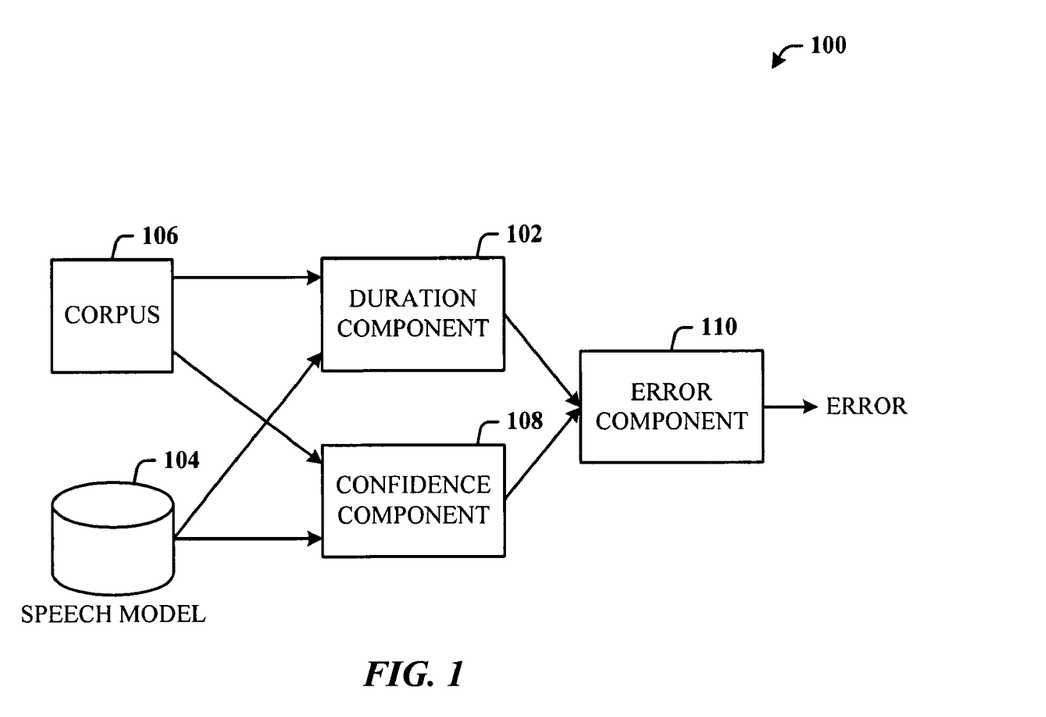
FIG. 1 illustrates a computer-implemented error checking system in accordance with the disclosed architecture.

Referring initially to the drawings, FIG. 1 illustrates a computer-implemented error checking system 100 in accordance with the disclosed architecture. The system 100 includes a duration component 102 for computing word duration probability data based on a speech model 104, and a corpus 106 of transcription data and wave data. The system 100 includes a confidence component 108 for computing a word confidence score based on recognition processing of the speech model 104, the wave data of the corpus 106, and alignment of the corpus transcription data and the wave data. The word duration probability data and word confidence score are then processed using an error component 110 for detecting error.

Figure 2:
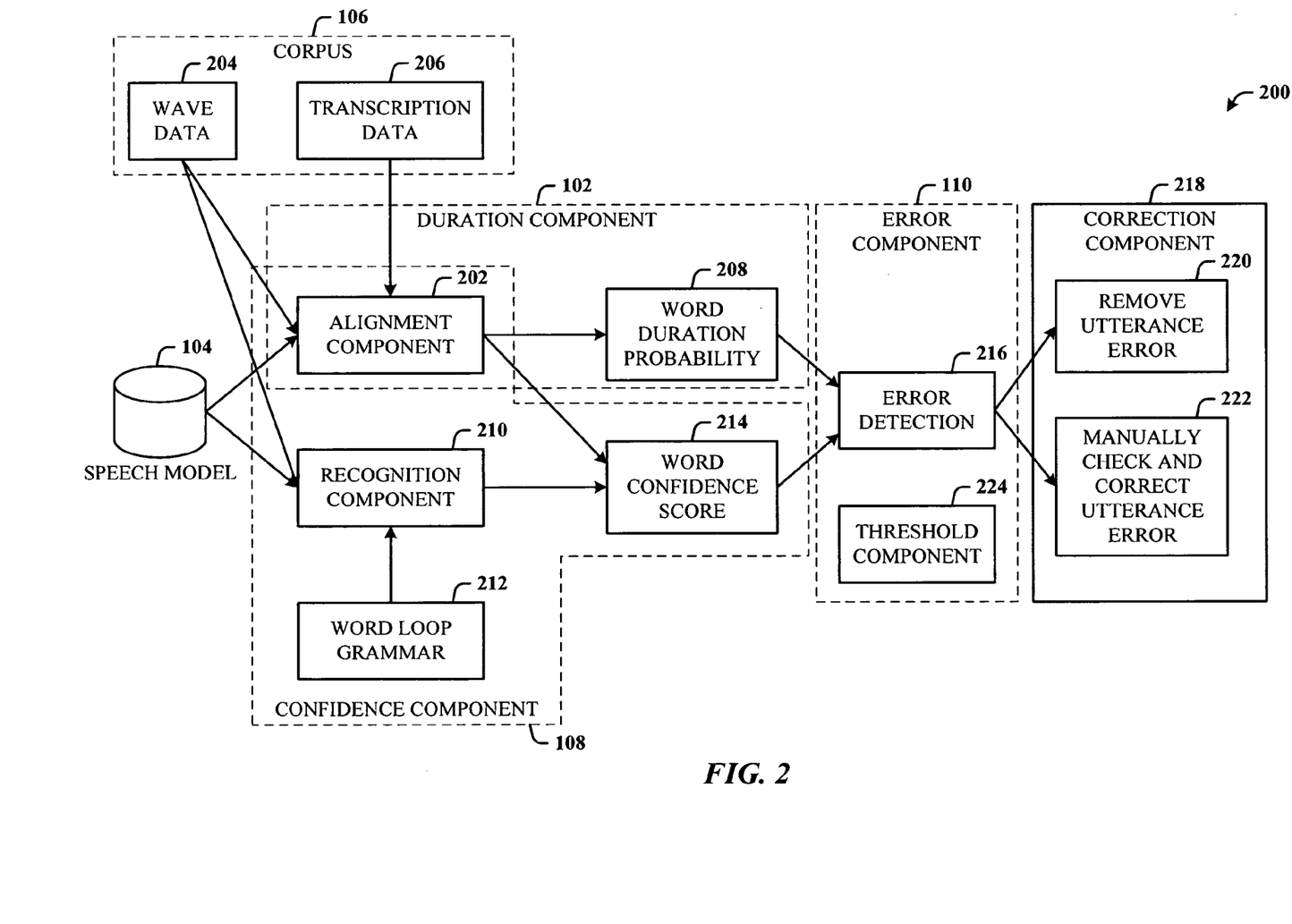
FIG. 2 illustrates data flow associated with a system for error checking.

FIG. 2 illustrates data flow associated with a system 200 for error checking. The system 200 receives the corpus 106 for testing. This can be one of many types of corpus employed for recognition processing and which can undergo testing for errors or quality. An alignment component 202 receives the speech model 104, wave data 204 of the corpus 106, as well as transcription data 206 of the corpus 106, and outputs word duration probability data 208. In this particular embodiment, the duration component 102 can be defined as including the alignment component 202.

The speech model 104, wave data 204, and a word loop grammar 212 are used by a recognition component 210 for recognition processing, which when processed with the alignment results, outputs a word lattice graph from which is derived a word confidence score 214.

The word duration probability data 208 and the word confidence score 214 are input to the error component 110 for an error detection process 216. Output of the error detection process 216 is to a correction component 218 that includes a process 220 for removing utterance error and/or a process 222 that facilitates manually checking and correcting utterance error.

The error component 110 can also include a threshold component 224 for evaluating the word duration probability data 208 and the word confidence score 214. A word can be considered mis-transcribed based on values of the word duration probability 208 and the word confidence score 214 relative to a threshold value defined as part of the threshold component 224.

The alignment component 202 is shown as overlapping in both the duration component 102 and the confidence component 108. This is for illustrating that computation of the word confidence score 214 is based on both the word lattice graph from the recognition component 210 and forced alignment data from the alignment component 202.

With respect to word duration probability, a histogram of duration probability distribution is built for phone/syllable/word models. Then, outlying points of the distribution are suspected as having the transcription error. This is based on an assumption that word duration tends to be irregular if aligned to incorrect transcription data. The duration of the word can be modeled by a Gaussian distribution or a Gamma distribution, for example.

An example of modeling the duration of an $n^{th}$ word by Gaussian (or normal N) distribution $N(d, \mu_n, \Sigma_n)$. The mean $\mu$ and variance are estimated by maximum likelihood criterion from the training data, where T is the matrix transpose. For a special unit n with duration d, the confidence score can be defined as $$N(d, \mu_{d,n}, \Sigma_{d,n}) = \exp\left(-\frac{(d-\mu_{d,n})^T \Sigma_{d,n}^{-1} (d-\mu_{d,n})}{2}\right)$$

A confidence score is a probabilistic measure for verifying the recognized (hypothesized) entities. Confidence scores include, but are not limited to, a posterior probability, a generalized posterior probability, or a generalized phone posterior probability. These probabilities assess the reliability of a word by looking at the reappearances of the word in a lattice graph, and reweighing exponentially the corresponding acoustic and language model likelihoods.

The word duration probability data and word confidence score are evaluated for each word in an utterance. Then, the word can be determined to have transcription error if the word duration probability data is below a threshold, or the word posterior probability is below a threshold. An utterance can be considered to contain transcription error if the number of mis-transcribed words is above a threshold.

For insertion and substitution errors, the word confidence score can be used to detect these errors. In one implementation, the word confidence score is not used to detect deletion error because the word hypothesis does not exist.

In the recognition component 210 and alignment component 202, silence can be added at the beginning of the utterance, the end of the utterance, and between words of the utterance. The confidence scores of these silences can then be evaluated to detect if there are deletion errors.

Figure 3:
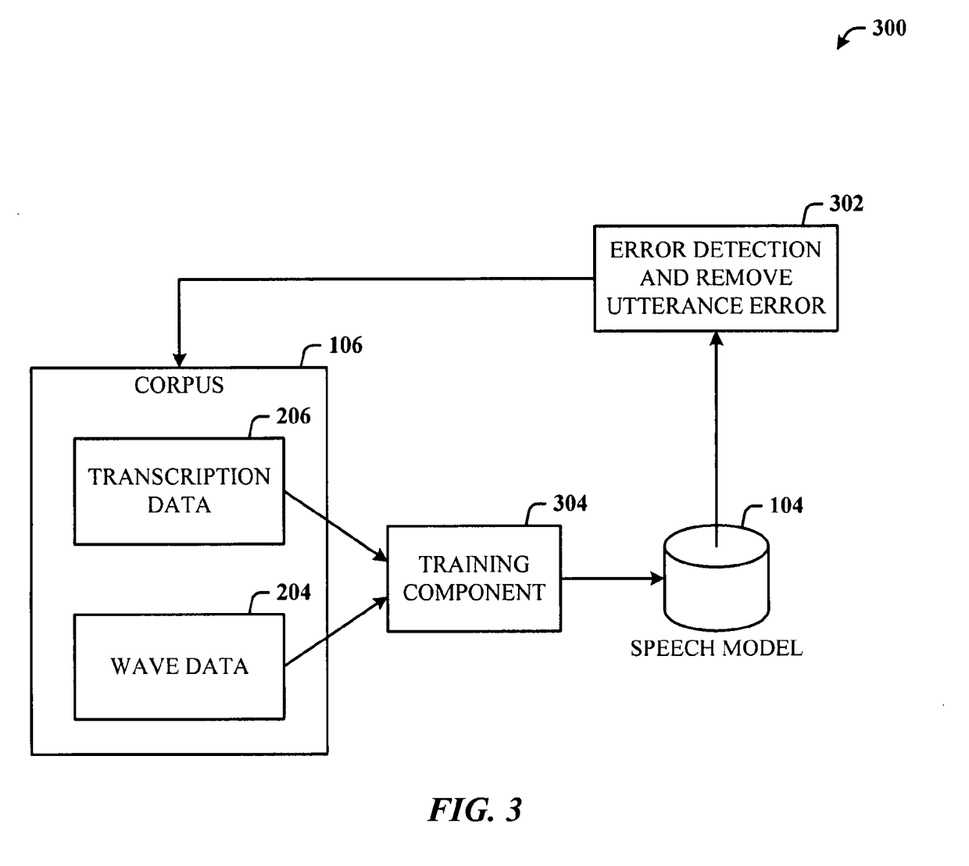
FIG. 3 illustrates a system for retraining of the raw model based on error detection and the removal of utterance error in accordance with the disclosed architecture.

FIG. 3 illustrates a system 300 for retraining of the speech model 104 based on error detection and the removal of utterance error 302 in accordance with the disclosed architecture. Conventionally, retraining includes the transcription data 206 and audio wave data 204 as inputs to a training component 304 for retraining the speech model 104. However, the disclosed system 300 further utilizes the processes for error detection and removal of utterance error 302 to feed back the revised corpus for the retraining process of the speech model 104. In other words, based on the detected error, error correction can be applied to the corpus 106 to correct utterance errors and other detected errors to provide a better quality corpus 106 of transcription and wave data for retraining of the speech model 104. The feedback process can occur over several iterations to obtain the desired quality in the speech model.

Figure 4:
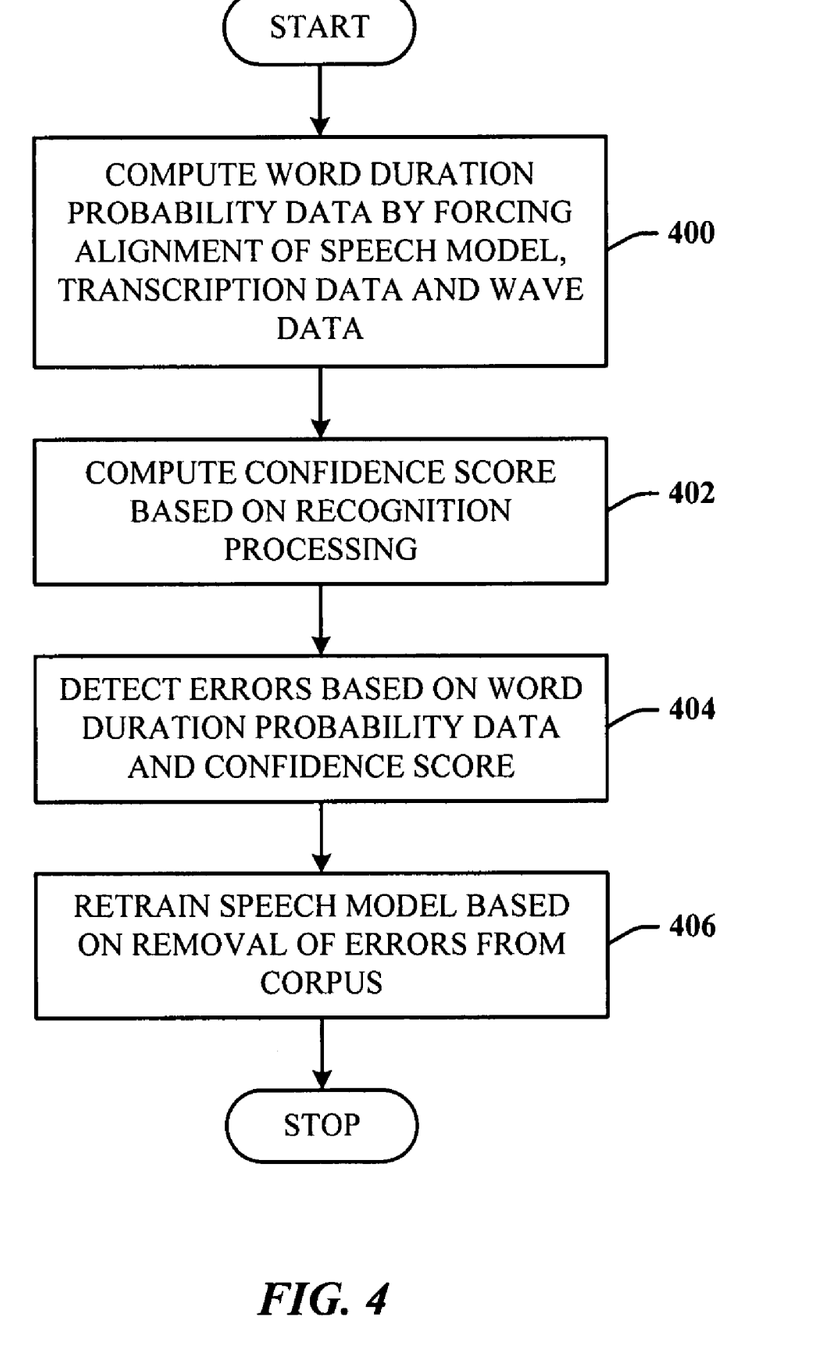
FIG. 4 illustrates a method of error checking in accordance with an embodiment.

FIG. 4 illustrates a method of error checking in accordance with an embodiment. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, the word duration probability data is computed by forcing alignment of the speech model, transcription data and the wave data. At 402, the confidence score is computed based on recognition processing. At 404, errors are detected based on the word duration probability data and the word confidence score. At 406, the speech model is retrained based on removal of the errors for the corpus.

Figure 5:
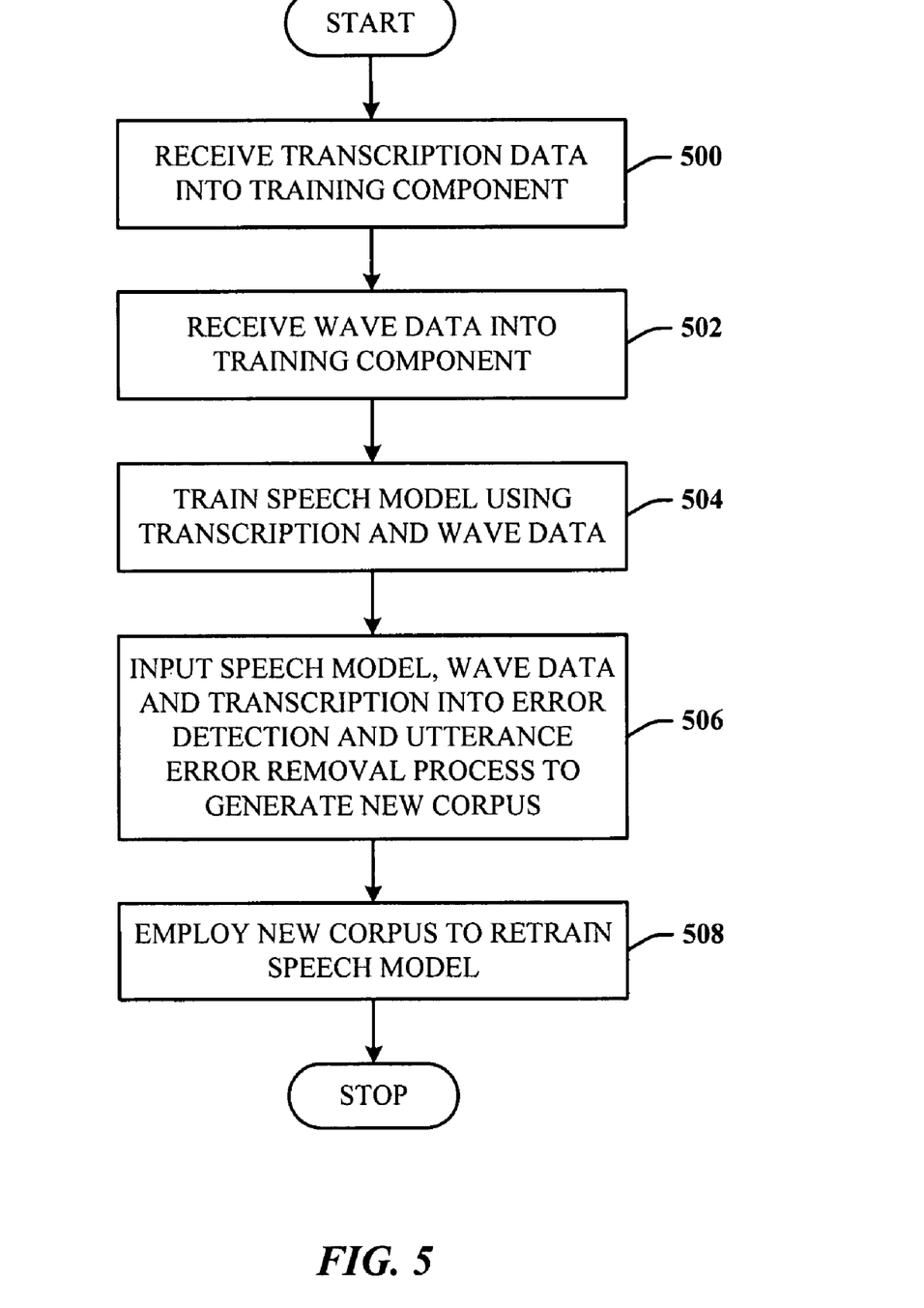
FIG. 5 illustrates a method of model retraining using error detection and utterance error removal.

FIG. 5 illustrates a method of model retraining using error detection and utterance error removal. At 500, transcription data is received into the training component. At 502, wave data is received into the training component. At 504, the speech model is trained using the transcription and wave data. At 506, the trained speech model, transcription data and wave data are input into an error detection and utterance error removal process to generate a new corpus. At 508, the new corpus is used to retrain the speech model.

Figure 6:
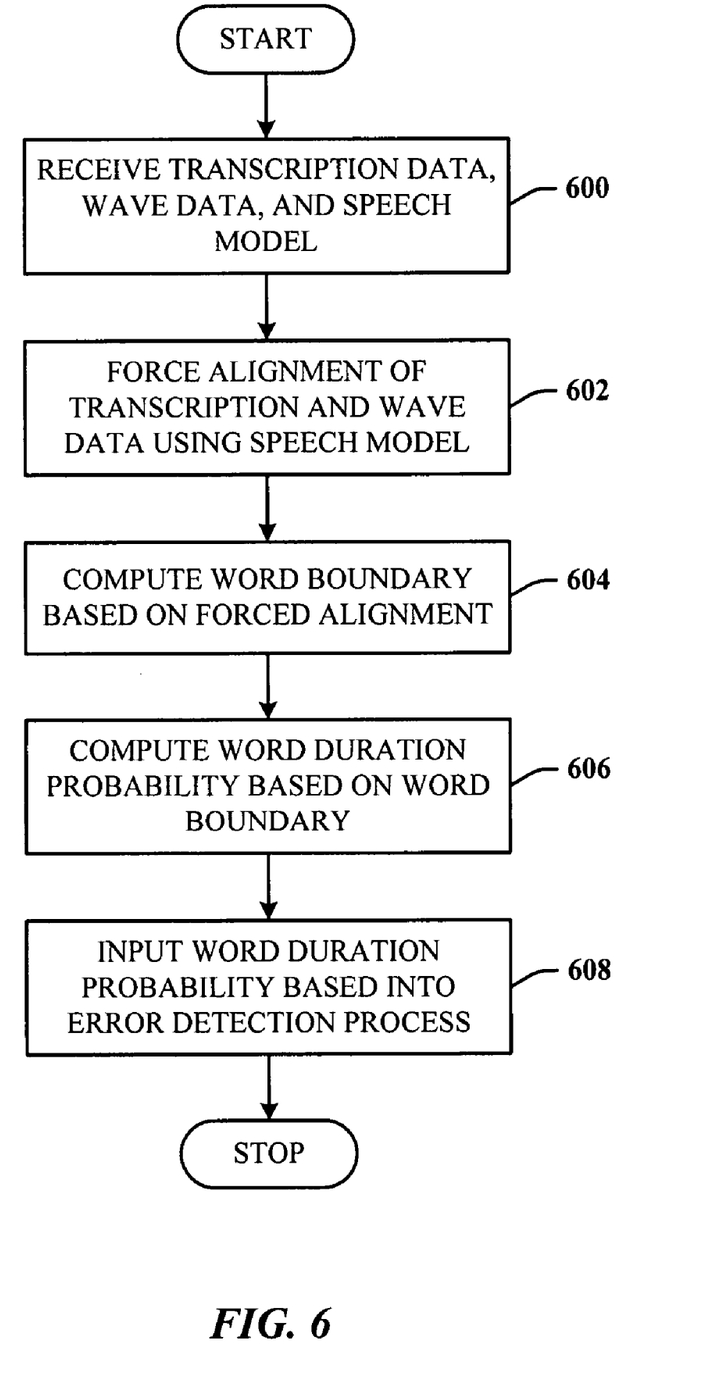
FIG. 6 illustrates a method of utilizing forced alignment for error detection processing.

FIG. 6 illustrates a method of utilizing forced alignment for error detection processing. At 600, transcription data, wave data and the speech model are received. At 602, alignment of raw transcription data and wave data is forced using the speech model. At 604, word boundary data is computed based on the forced alignment. The word boundary data is input for word duration probability processing, as indicated at 606. At 608, the word duration probability data is input to an error detection process.

Figure 7:
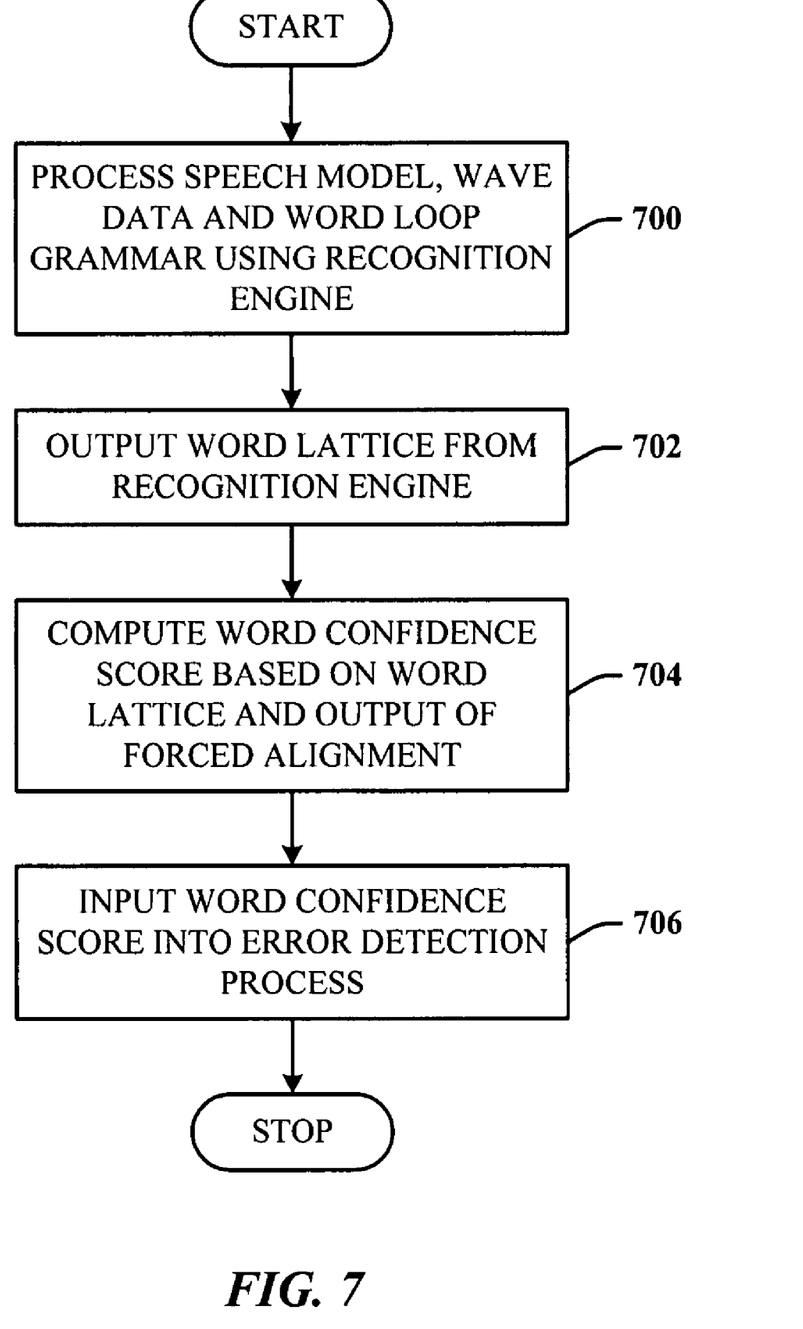
FIG. 7 illustrates a method of creating a word confidence score for error detection processing.

FIG. 7 illustrates a method of creating a word confidence score for error detection processing. At 700, the speech model, wave data and word loop grammar are processed using a recognition engine. At 702, a word lattice is output from the recognition engine. At 704, a word confidence score is computed based on the word lattice and output of the forced alignment. At 706, the word confidence score is input to the error detection process.

Figure 8:
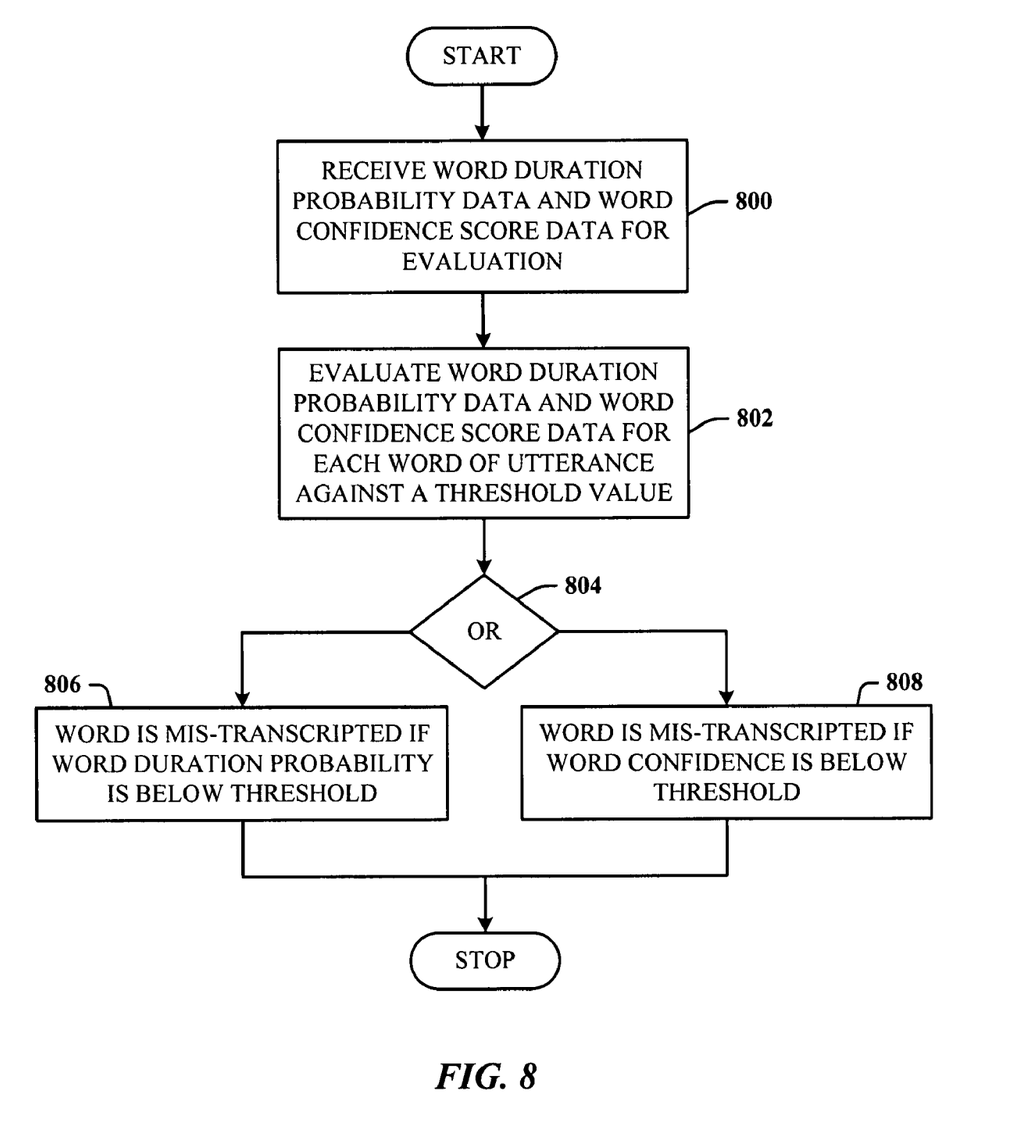
FIG. 8 illustrates a method of error detection based on a threshold value.

FIG. 8 illustrates a method of error detection based on a threshold value. At 800, word duration probability data and word confidence score data are received for evaluation. At 802, the word duration probability data and the word confidence score data are evaluated for each word of an utterance and against a threshold value. At 804, two alternative methods can be employed for error processing. At 806, a word is considered to be mis-transcribed if the word duration probability data is below the threshold value. Alternatively, at 808, a word is considered to be mis-transcribed if the word confidence data is below the threshold value.

Figure 9:
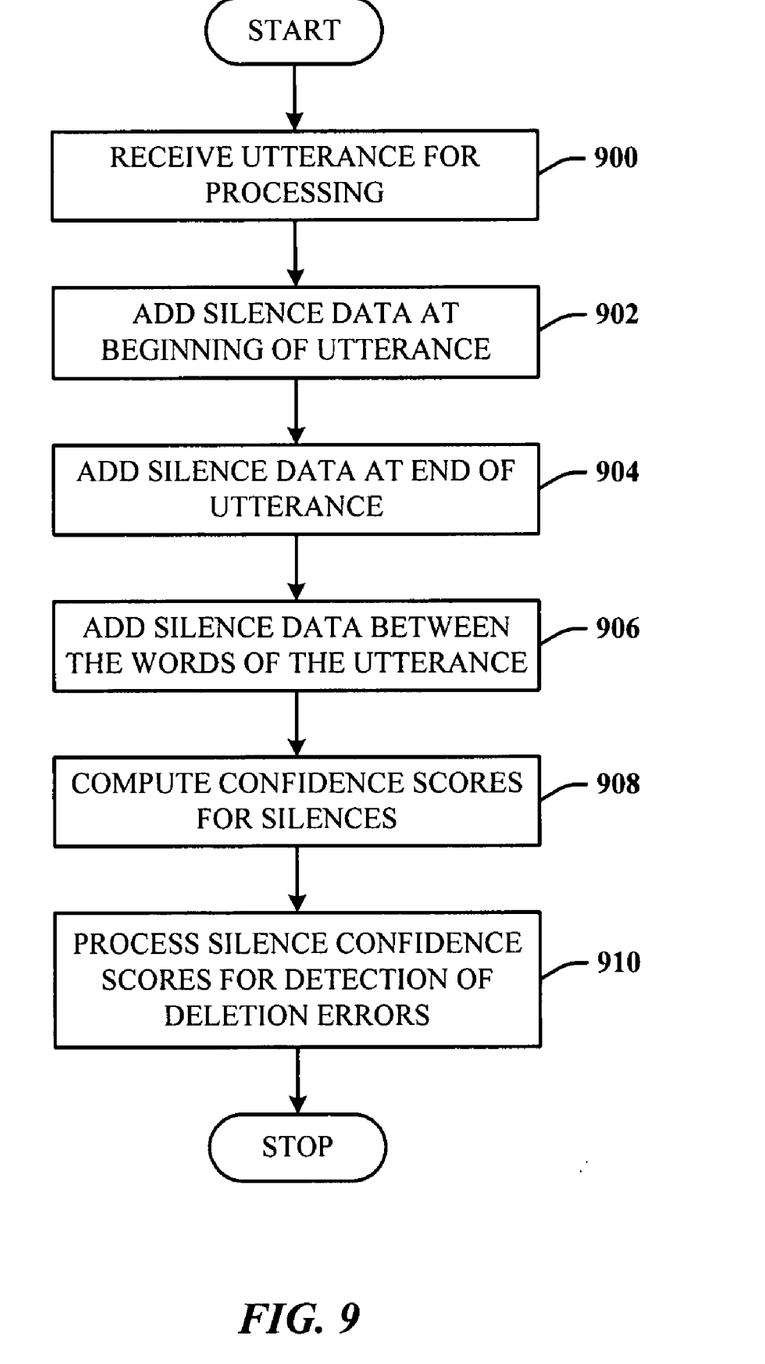
FIG. 9 illustrates a method of using silence data for detecting deletion error.

FIG. 9 illustrates a method of using silence data for detecting deletion error. At 900, an utterance of words is received for processing. At 902, silence data is added to beginning of utterance. At 904, silence data is added to the end of utterance. At 906, silence data is added between the words of the utterance. At 908, confidence scores for the silences are computed. At 910, the silence confidence scores are processed for the detection of deletion errors.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
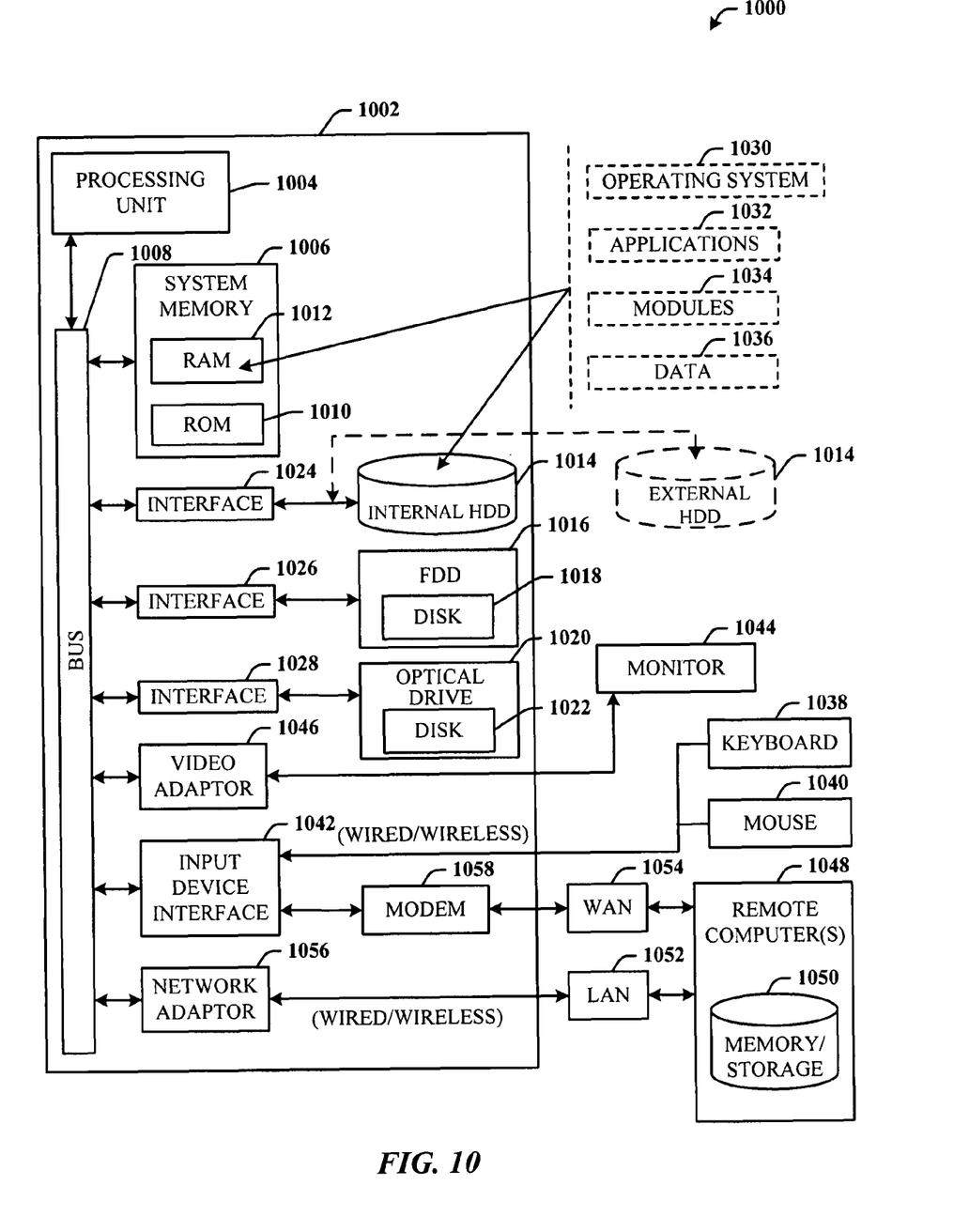
FIG. 10 illustrates a block diagram of a computing system operable to process speech refinement using transcription error detection in accordance with the disclosed architecture.

Referring now to FIG. 10, there is illustrated a block diagram of a computing system 1000 operable to process speech refinement using transcription error detection in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034, and program data 1036 can include the following: the duration component 102, corpus 106, confidence component 108, and error component 110 of FIG. 1, the alignment component 202, the wave data 204 and transcription data 206, recognition component 210, word loop grammar 212, error detection component 216, correction component 218, and threshold component 224 of FIG. 2, the data including the word duration probability data 208 and the word confidence score data 214, and, the training component 304 of FIG. 3, for example.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented error checking system, comprising:
 a duration component for computing word duration probability data based on a speech model, and a corpus of transcription data and wave data;
 a confidence component for computing a confidence score based on recognition processing of the speech model and wave data, and alignment output of the transcription data and the wave data;
 an error component for detecting error based on the duration probability data and the confidence score; and
 a training component for retraining the speech model based on removal of the error from the corpus.

2. The system of claim 1, further comprising a correction component for removing utterance error from the speech model in a first iteration and feeding back the speech model of the first iteration for retraining of the speech model in a second iteration.

3. The system of claim 1, further comprising a correction component that facilitates manually checking a transcription error and correcting utterance errors for feedback during retraining of the speech model.

4. The system of claim 1, further comprising an alignment component that forces alignment of the transcription data, the wave data, and the speech model to generate the word duration probability data.

5. The system of claim 1, further comprising a recognition component for performing the recognition processing on the wave data and the speech model using a word loop grammar and generating a word lattice graph.

6. The system of claim 1, further comprising a correction component for using transcription error to remove from the corpus utterances having utterance errors.

7. The system of claim 1, wherein the error component facilitates manually checking a transcription error found automatically by an error checking system.

8. The system of claim 1, wherein the corpus with transcription error removed is used for retraining the speech model.

9. The system of claim 1, wherein the confidence score is based on a posterior probability, generalized posterior probability, or a generalized phone posterior probability.

10. The system of claim 1, further comprising a threshold component for detecting transcription error based on the word duration probability data relative to a threshold value.

11. The system of claim 1, further comprising a threshold component for detecting transcription error based on the confidence score relative to a threshold value.

12. A computer-implemented method of error checking, comprising:
   - computing duration probability data by forcing alignment of a speech model and a corpus of transcription data and wave data;
   - computing a confidence score based on recognition processing;
   - detecting errors based on the duration probability data and the confidence score; and
   - retraining the speech model based on removal of the errors from the corpus.

13. The method of claim 12, further comprising retraining the corpus based on detection of the errors.

14. The method of claim 12, further comprising calculating the duration probability data based on a word boundary.

15. The method of claim 12, further comprising generating a word lattice based on recognition processing of the speech model and the wave data, the word lattice employed to compute the word confidence score.

16. The method of claim 12, further comprising building a histogram of duration distributions for word models.

17. The method of claim 16, further comprising selecting outlying duration distributions as having the errors.

18. The method of claim 12, further comprising modeling the duration probability data according to a Gaussian distribution or a Gamma distribution.

19. The method of claim 12, further comprising detecting error based on silence confidence scores.

20. A computer-implemented system, comprising:
   - computer-implemented means for computing duration probability data by forcing alignment of a speech model and a corpus of transcription data and wave data;
   - computer-implemented means for computing a confidence score based on recognition processing;
   - computer-implemented means for detecting errors based on the duration probability data and the confidence score; and
   - computer-implemented means for retraining the speech model based on removal of the errors from the corpus.

* * * * *